No. 771,088. PATENTED SEPT. 27, 1904.
W. V. PALEY & T. H. BUSSEY.
EGG BEATER.
APPLICATION FILED JAN. 30, 1904.
NO MODEL.

WITNESSES:
W. C. Abbott
W. J. Bernhard

INVENTORS:
William Valentine Paley
Thomas Henry Bussey
BY
ATTORNEYS

No. 771,088. Patented September 27, 1904.

UNITED STATES PATENT OFFICE.

WILLIAM VALENTINE PALEY AND THOMAS HENRY BUSSEY, OF CHARTERS TOWERS, QUEENSLAND, AUSTRALIA, ASSIGNORS TO THE PALEY-BUSSEY NOVELTY CHAIN EGG BEATER AND CAKE MIXER CO., LTD., OF CHARTERS TOWERS, QUEENSLAND, AUSTRALIA.

EGG-BEATER.

SPECIFICATION forming part of Letters Patent No. 771,088, dated September 27, 1904.

Application filed January 30, 1904. Serial No. 191,255. (No model.)

*To all whom it may concern:*

Be it known that we, WILLIAM VALENTINE PALEY and THOMAS HENRY BUSSEY, both subjects of the King of Great Britain, and residents of Charters Towers, Queensland, Australia, have invented a new and Improved Egg-Beater, of which the following is a full, clear, and exact description.

Our invention relates to improvements in a culinary device for beating eggs, for beating and mixing compounds for sponge and other cakes, and for beating milk or for any kind of substance.

The primary object of this invention is to produce a simple, convenient, and cheap article for rapidly and easily beating food substances.

Another object is to materially increase the effective area of the beating-surface and at the same time produce a compact article.

A further object is to provide the article with means against which egg-shells may easily be broken and which serves as a stay or brace to the strands forming the shank of the article.

Further objects and advantages of the invention will appear in the course of the subjoined description, and the actual scope thereof will be defined by the annexed claims.

Reference is to be had to the accompanying drawings, forming a part of this specification, in which similar characters of reference indicate corresponding parts in both the figures.

Figure 1:
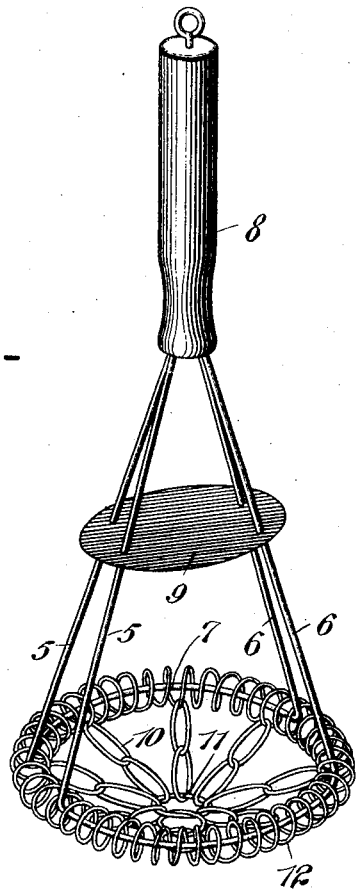
Figure 2:
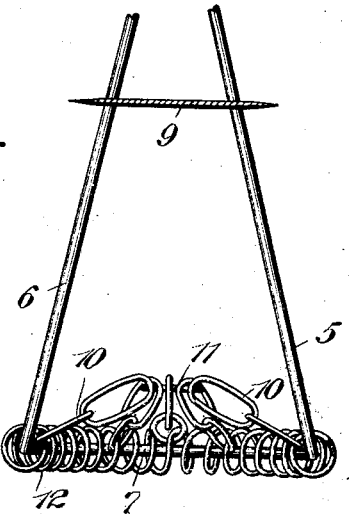

Figure 1 is a perspective view of an egg-beater constructed in accordance with our invention; and Fig. 2 is a vertical sectional elevation through our egg-beater, omitting the handle and a part of the shank.

In carrying our invention into practice we provide a support for a novel type of beating-surface, the latter consisting of two members adapted to quickly and easily break up the yolks and the albumen of eggs when the implement is properly manipulated by hand. The support for the beating-surface is represented by the drawings as made of two wires, each of which is bent from a single length to provide arms 5 and 6 and the curved connecting portion 7. Each wire is so bent that the arms 5 6 lie at an angle to the curved portion 7, and the wires are assembled for said curved portions 7 to lie in the same transverse plane, while the arms 5 6 converge toward the handle 8. The arms are embedded or secured firmly in the handle, and they constitute the shank between the beating-surface and said handle. The arms or shank are united and stayed by a flat plate 9, having suitable openings for the passage of the arms therethrough. This plate is arranged to span the spaces between the arms of the shank, and it presents a sharp edge against which the egg-shells may be broken easily and conveniently when it is desired to place the yolks and albumen in a vessel for beating them with the article of our invention.

The important feature of our invention is a loose beating member which is operatively connected with the support, so as to lie within the latter and to be capable of a free limited play or movement with respect to the curved bars 7 of said support. This beating member is shown by the drawings in the form of a plurality of short chains 10, the links of which are loosely interlocked one with the other and are adapted to be connected with the annular support formed by the curved bars 7. The short lengths of chain 10 are united at the middle of the beating-surface by a ring, loop, or link 11, which is common to all of the chain lengths 10, and this central connecting-loop 11 is supported or carried by the inner links of the chains 10, so as to be free to vibrate or play with the chains in the operation of beating the eggs or other food substance.

In the embodiment of the invention shown by the drawings we provide the beating-surface with an annular beating member 12, which is formed by a continuous spirally-coiled wire that is fitted loosely on the curved bars 7 of the support. This beating member 12 materially increases the effective area of the beating-surface, and said member 12 extends continuously around the annular support afforded by the bars 7. It will be observed that the wires, each of which is bent to produce the arms 5 6 and the bars 7, are separated somewhat, so as to provide intervening spaces, and the coiled beating member 12 extends continuously along the curved bars 7 and spans the spaces between the wires forming the shank. This coiled beating member is operatively related to the inner beating member, which is formed by the plurality of radial lengths of chain 10, and, as shown, we prefer to loosely attach the outer links of the chains 10 to the convolutions of the coiled member 12 on the inner side thereof.

In the operation of beating eggs the implement is whipped back and forth in any desirable way within the receptacle containing the food substance to be beaten, and by rapidly operating the implement the members 10 12 cut through the yolk and whites of the eggs, so as to produce a foamy substance. The links of the chains 10 clash together during the manipulation of the article, and the coiled member 12 has a certain amount of play with respect to the curved bars 7 of the support, whereby the two beating members 10 12 operate to rapidly and efficiently place the substance in the desired condition.

We do not limit ourselves to any particular shape or material of the handle 8, nor to the employment of any desired number of chains 10, nor to the particular form of the links of the chain. Furthermore, we do not wish to be understood as limiting ourselves strictly to the employment of the coiled annular beating member 12, because in some cases we may omit this coiled member 12 and connect the chains of the beating member 10 directly to the substantially annular support afforded by the shank of the implement.

Having thus described our invention, we claim as new and desire to secure by Letters Patent—

1. A device of the class described, comprising a support constructed of two pieces of wire each bent to form converging members and an outwardly-curved member connecting the widely-separated extremities thereof, and a plurality of chains extending between said curved members.

2. A device of the class described, comprising a support constructed of two pieces of wire each bent to form converging members and an outwardly-curved member connecting the widely-separated extremities thereof, and a plurality of chains extending between said curved members, and connected by a common coupling.

3. A device of the character described, comprising a support constructed of two pieces of wire each bent to form converging members, with the widely-separated ends thereof united by an outwardly-curved member, a coiled beating member extending about said curved members, and loosely-connected chains attached to said coiled member.

4. An article of the class described, comprising a suitable support, an annular coiled beating member fitted thereon, and a beating member having short lengths of chain connected loosely to the coiled beating member.

5. A device of the character described, comprising a support constructed of two pieces of wire each bent to form converging members with the widely-separated ends thereof united by an outwardly-curved member, a coiled beating member extending about said curved members, and loosely-connected chains attached to said coiled member, said wires having a handle fitted thereto, and being provided with a stay-plate.

In testimony whereof we have signed our names to this specification in the presence of two subscribing witnesses.

WILLIAM VALENTINE PALEY.
THOMAS HENRY BUSSEY.

Witnesses:
DONALD McCALLUM LEYDEN,
JOHN FORSYTH TRAIL.